(12) United States Patent
Li

(10) Patent No.: US 12,207,268 B2
(45) Date of Patent: Jan. 21, 2025

(54) METHOD FOR TRANSMITTING UPLINK CONTROL INFORMATION, METHOD FOR RECEIVING UPLINK CONTROL INFORMATION, TERMINAL, AND NETWORK-SIDE DEVICE

(71) Applicant: VIVO MOBILE COMMUNICATION CO., LTD., Guangdong (CN)

(72) Inventor: Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 583 days.

(21) Appl. No.: 17/512,880

(22) Filed: Oct. 28, 2021

(65) Prior Publication Data

US 2022/0053552 A1 Feb. 17, 2022

Related U.S. Application Data

(63) Continuation of application No. PCT/CN2020/087234, filed on Apr. 27, 2020.

(30) Foreign Application Priority Data

Apr. 29, 2019 (CN) .......................... 201910356903.6

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/0051* (2013.01);
(Continued)

(58) Field of Classification Search
CPC ... H04W 72/23; H04W 72/542; H04W 72/21; H04L 1/1812; H04L 5/0051
(Continued)

(56) References Cited

U.S. PATENT DOCUMENTS

2016/0100398 A1 4/2016 Xia et al.
2018/0006790 A1 1/2018 Park et al.
(Continued)

FOREIGN PATENT DOCUMENTS

CN 107027181 A 8/2017
CN 107276715 A 10/2017
(Continued)

OTHER PUBLICATIONS

Mediatek Inc. "Discussion on UCI on PUSCH", 3GPP TSG RAN WG1 Meeting 91, R1-1719573, Reno, USA, Nov. 27-Dec. 1, 2017.
(Continued)

*Primary Examiner* — Hermon Asres
(74) *Attorney, Agent, or Firm* — Price Heneveld LLP

(57) ABSTRACT

A method for transmitting uplink control information, a method for receiving uplink control information, a terminal, and a network-side device are provided. The method for transmitting uplink control information is applied to a terminal and includes: obtaining a target parameter of each type of uplink control information in at least one type of uplink control information based on a type of a configured grant PUSCH, where the target parameter is used for determining the number of resource elements REs to be occupied by the uplink control information in the configured grant PUSCH; determining positions of REs to be occupied by each type of uplink control information in the at least one type of uplink control information; and based on the number of REs and the positions of REs, sending the at least one type of uplink control information through the configured grant PUSCH.

18 Claims, 6 Drawing Sheets

(51) Int. Cl.
*H04L 5/00* (2006.01)
*H04W 72/21* (2023.01)
*H04W 72/542* (2023.01)

(52) U.S. Cl.
CPC .......... *H04L 5/0053* (2013.01); *H04W 72/21* (2023.01); *H04W 72/542* (2023.01)

(58) Field of Classification Search
USPC ........................................................ 370/329
See application file for complete search history.

(56) References Cited

U.S. PATENT DOCUMENTS

| | | | |
|---|---|---|---|
| 2019/0045536 A1 | 2/2019 | Gao et al. | |
| 2019/0199477 A1 | 6/2019 | Park et al. | |
| 2019/0230688 A1* | 7/2019 | Huang | H04L 5/001 |
| 2021/0068100 A1* | 3/2021 | Takeda | H04W 72/23 |

FOREIGN PATENT DOCUMENTS

| | | | |
|---|---|---|---|
| JP | 2021508991 A | 3/2021 | |
| WO | 2014201614 A1 | 12/2014 | |
| WO | 2018143740 A1 | 8/2018 | |
| WO | 2019142341 A1 | 7/2019 | |

OTHER PUBLICATIONS

Intel Corporation, "UCI on PUSCH", 3GPP TSG RAN WG1 Meeting #92, R1-1802412, Athens, Greece, Feb. 26-Mar. 2, 2018.

Ericsson, "On Mapping of UCI on PUSCH and Other Issues", 3GPP TSG RAN WG1 Meeting AH 1801, R1-1800949, Vancouver, Canada, Jan. 22-26, 2018.

"3rd Generation Partnership Project; Technical Specification Group Radio Access Network; NR; Radio Resource Control (RRC) protocol specification (Release 15)", 3GPP TS 38.331 V15.5.1 (Apr. 2019), Valbonne, France.

"3rd Generation Partnership Project; Technical Specification Group Radio Access Network; NR; Radio Resource Physical layer procedures for data (Release 15)", 3GPP TS 38.214 V15.5.0 (Mar. 2019), Valbonne, France.

"3rd Generation Partnership Project; Technical Specification Group Radio Access Network; NR; Radio Resource Physical layer procedures for control (Release 15)", 3GPP TS 38.213 V15.5.0 (Mar. 2019), Valbonne, France.

CATR, UCI transmission on grant free PUSCH, 3GPP TSG RAN WG1 Meeting #92, R1 1801907, Feb. 26-Mar. 2, 2018, Athens, Greece.

Interdigital Inc., Configured Grant Enhancement s in NR-U, 3GPP TSG RAN WG1 Meeting #95, R1-1813223, Nov. 12-16, 2018, Spokane, USA.

OPPO, On configured grant for NR-U, 3GPP TSG RAN WG1 #96, R1-1901925, Feb. 25-Mar. 1, 2019, Athens, Greece.

LG Electronics, Discussion on configured grant for NR-U, 3GPP TSG RAN WG1 Meeting #96bis, R1-1904625, Apr. 8-12, 2019, Xi'an, China.

LG Electronics, "Enhancements to UCI on PUSCH for Rel-13 CA", 3GPP TSG RAN WG1 Meeting #81, R1-152719, Fukuoka, Japan, May 25-29, 2015.

VIVO, "Outcome of offline discussion on Configured grant enhancement", 3GPP TSG RAN WG1#96bis, R1-1905792, Xi'an, China, Apr. 8-12, 2019.

Intel Corporation, "Enhanced UL CG PUSCH", 3GPP TSG RAN WG1 RAN1#96bis, R1-1904310, Apr. 8-12, 2019, Xi'an, China.

NEC, "Discussion on configured grant enhancement in NR-U", 3GPP TSG RAN WG1 #96bis, R1-1904660, Apr. 8-12, 2019, Xi'an, China.

* cited by examiner

METHOD FOR TRANSMITTING UPLINK CONTROL INFORMATION, METHOD FOR RECEIVING UPLINK CONTROL INFORMATION, TERMINAL, AND NETWORK-SIDE DEVICE

CROSS-REFERENCE TO RELATED APPLICATIONS

This application is continuation application of PCT International Application No. PCT/CN2020/087234 filed on Apr. 27, 2020, which claims priority to Chinese Patent Application No. 201910356903.6 filed in China on Apr. 29, 2019, the disclosures of which are incorporated herein by reference in their entireties.

TECHNICAL FIELD

This disclosure relates to the field of communications technologies, and in particular, to a method for transmitting uplink control information, a method for receiving uplink control information, a terminal, and a network-side device.

BACKGROUND

In long term evolution (LTE) license assisted access (LAA), a physical uplink control channel (PUCCH) works in a licensed band, and an autonomous uplink physical uplink shared channel (AUL-PUSCH) works in an unlicensed band. Due to poor reliability of the unlicensed band, uplink control information (UCI) on the PUCCH is not multiplexed to the AUL-PUSCH, and therefore control information on the PUSCH includes only AUL-UCI information.

In new radio unlicensed (NRU), both a PUCCH and a configured grant PUSCH (CG-PUSCH) can work in an unlicensed band. In a case that both the PUCCH and the CG-PUSCH work in an unlicensed band, if the CG-PUSCH and the PUCCH overlap in time domain, according new radio (NR) R15 principles, user equipment (UE, also referred to as terminal) multiplexes UCI of the PUCCH to the CG-PUSCH for transmission. In this case, the CG-PUSCH may not only transmit CG-UCI, but also transmit UCI including hybrid automatic repeat request acknowledgement (Hybrid Automatic Repeat Request ACK, HARQ-ACK) HARQ-ACK/channel state information (CSI). Therefore, how the terminal correctly transmits information on the CG-PUSCH is a problem to be resolved urgently.

SUMMARY

Embodiments of this disclosure provide a method for transmitting uplink control information, a method for receiving uplink control information, a terminal, and a network-side device.

This disclosure uses the following solutions.

According to a first aspect, an embodiment of this disclosure provides a method for transmitting uplink control information, applied to a terminal and including:

obtaining a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

determining positions of REs to be occupied by each type of uplink control information in the at least one type of uplink control information; and based on the number of REs and the positions of REs, sending the at least one type of uplink control information through the configured grant PUSCH; where the at least one type of uplink control information includes first control information.

According to a second aspect, an embodiment of this disclosure provides a method for receiving uplink control information, applied to a network-side device and including:

determining a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

determining positions of REs to be occupied by each type of uplink control information in the at least one type of uplink control information; and based on the number of REs and the positions of REs, receiving the at least one type of uplink control information on the configured grant PUSCH; where the at least one type of uplink control information includes first control information.

According to a third aspect, an embodiment of this disclosure provides a terminal, including:

an obtaining module, configured to obtain a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

a first determining module, configured to determine the positions of REs to be occupied by each type of uplink control information in the at least one type of uplink control information; and a transmitting module, configured to: based on the number of REs and the positions of REs, send the at least one type of uplink control information through the configured grant PUSCH; where the at least one type of uplink control information includes first control information.

According to a fourth aspect, an embodiment of this disclosure provides a terminal, including a memory, a processor, and a computer program stored in the memory and capable of running on the processor. When the computer program is executed by the processor, the steps of the method for transmitting uplink control information described above are implemented.

According to a fifth aspect, an embodiment of this disclosure provides a network-side device, including:

a second determining module, configured to determine a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

a third determining module, configured to determine the positions of REs to be occupied by each type of uplink control information in the at least one type of uplink control information; and a receiving module, configured to: based on the number of REs and the positions of REs, receive the at least one type of uplink control information on the configured grant PUSCH; where the at least one type of uplink control information includes first control information.

According to a sixth aspect, an embodiment of this disclosure provides a network-side device, including a memory, a processor, and a computer program stored in the memory and capable of running on the processor. When the computer program is executed by the processor, the steps of the method for receiving uplink control information described above are implemented.

According to a seventh aspect, an embodiment of this disclosure further provides a computer-readable storage medium. The computer-readable storage medium stores a computer program, and when the computer program is executed by a processor, the steps of the method for transmitting uplink control information described above or the steps of the method for receiving uplink control information described above are implemented.

DESCRIPTION OF EMBODIMENTS

Figure 1:
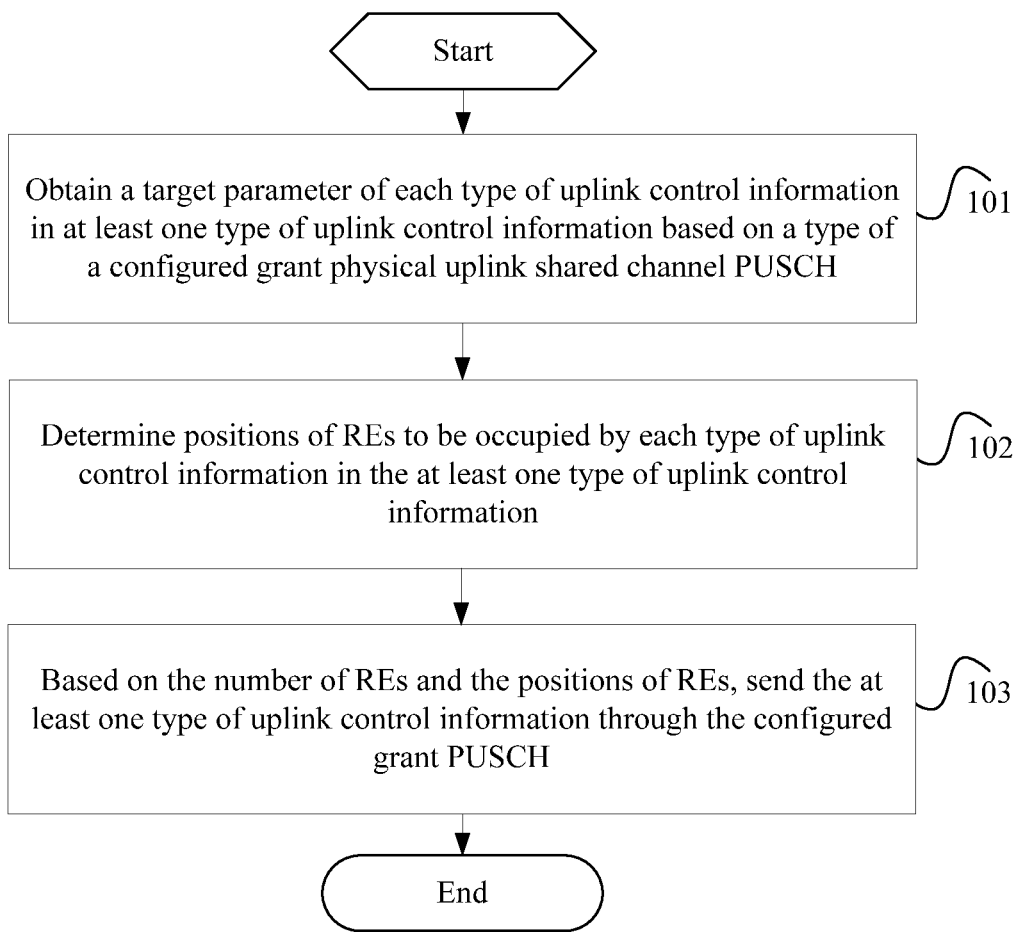
FIG. 1 is a schematic flowchart of a method for transmitting uplink control information according to an embodiment of this disclosure.

To make the objectives, technical solutions, and advantages of this disclosure clearer, the following further describes this disclosure in detail with reference to the accompanying drawings and specific embodiments.

In the description of the embodiments of this disclosure, technologies related to the embodiments of this disclosure are first described as follows:

In future communication systems, unlicensed bands may serve as a supplement to licensed bands to facilitate capacity expansion for operators. In order to be consistent with NR deployment and maximize access based on NR unlicensed bands, the unlicensed bands can work in 5 GHz, 37 GHz, and 60 GHz bands. With a large bandwidth (80 MHz or 100 MHz) of the unlicensed band, implementation complexity of a base station and UE can be reduced. Unlicensed bands are shared by a plurality of technologies (RATs), such as WiFi, radar, and LTE-LAA; therefore, in some countries or regions, unlicensed bands need to be used in compliance with regulations, for example, rules such as listen before talk (LBT) and maximum channel occupancy time (MCOT), so as to ensure that all devices can use such resources fairly. When a transmission node needs to send information and needs to perform LBT, energy detection (ED) is performed on surrounding nodes. When a detected power is less than a threshold, a channel is considered to be idle, available for transmission of the transmission node; otherwise, the channel is considered to be busy, unavailable for transmission of the transmission node. The transmission node may be a base station, UE, a WiFi access point (AP), or the like. After the transmission node starts transmission, a channel occupancy time cannot exceed the MCOT.

In NR, for requirements of low-latency services or periodic services, NR supports a transmission mode of uplink semi-statically configured grant to reduce a signaling exchange procedure and ensure low-latency requirements. Resources for configured grant transmission may be semi-statically configured by using radio resource control (RRC) signaling. When service data arrives, the UE may send data on a configured grant uplink channel (for example, PUSCH). Specifically, the configured grant PUSCH (CG-PUSCH) is classified into two types: type 1 and type 2. All parameters for type 1 are configured by using RRC, and once such parameters are configured, periodic transmission can be performed. Part of parameters for type 2 is configured by using RRC, and needs to be activated or deactivated by using downlink control information (DCI); other parameters are provided in activation DCI, and can be used periodically after being activated. In order to implement transmission on the CG-PUSCH, UCI carried in the CG-PUSCH (CG-UCI) is introduced, for example, hybrid automatic repeat request (HARQ) ID, new data indicator (NDI), or redundancy version (RV), that is, the UE side determines the foregoing parameters, and transmits a report to a base station on the CG-PUSCH, and the base station decodes the CG-PUSCH based on these parameters.

In NR R15, because the UE does not support simultaneous transmission of both PUCCH and PUSCH channels, when the PUCCH and the PUSCH overlap in time domain, if a time requirement is satisfied, the UE multiplexes UCI of the PUCCH to the PUSCH for transmission. The UCI includes: hybrid automatic repeat request acknowledgment (Hybrid Automatic Repeat Request ACK, HARQ-ACK) and channel state information (CSI). For UCI transmission on the PUSCH, the number of resource elements (RE) to be occupied by the UCI and positions of REs need to be determined according to specific rules, so as to correct decode data and UCI on the PUSCH. The number of REs occupied by the UCI is not only related to the number of UCI bits, but also depends on parameters betaOffset (configured by using RRC or indicated by using DCI) and alpha (configured by using RRC). Because the number of bits and importance may be different for different types of UCI (HARQ-ACK and CSI), the betaOffset parameter is different for different types of UCI and different mapping rules are used. For example, the HARQ-ACK is mapped to positions behind a demodulation reference signal (DMRS) and is adjacent to the DMRS, that is, being mapped to positions starting from the first available non-DMRS orthogonal frequency division multiplexing (OFDM) symbol after the DMRS, and the CSI is mapped to positions starting from the first usable non-DMRS OFDM symbol. Different types of UCI are mapped to the PUSCH all in a frequency-first manner.

In LTE LAA, in order to reduce access delay in the unlicensed bands, the UE may perform autonomous UL (AUL) transmission without grant from the base station. The base station configures AUL time resources for the UE by using RRC. AUL operations may be activated or deactivated by using DCI. During AUL activation, the base station uses activation DCI to notify the UE of frequency resources for AUL transmission, and a modulation and coding scheme (MCS). The UE performs uplink transmission on the AUL resources. During transmission on the AUL PUSCH, AUL-UCI is transmitted on the PUSCH. The AUL-UCI is mapped to symbols 1 to 12.

betaoffset of the AUL-UCI is configured by using RRC, and a table of correspondence between indexes and specific values of betaoffset is the same as that of HARQ-ACK. The AUL-UCI is mapped to symbols 1 to 12 on the AUL-PUSCH in a time-first manner.

This disclosure provides a method for transmitting uplink control information, a method for receiving uplink control information, a terminal, and a network-side device, so as to resolve the problem of how to ensure correct CG-PUSCH transmission in NRU.

As shown in FIG. 1, an embodiment of this disclosure provides a method for transmitting uplink control information, applied to a terminal and including:

Step 101: Obtain a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH.

It should be noted that the at least one type of uplink control information includes first control information being configured grant uplink control information (CG-UCI), specifically including: at least one of a hybrid automatic repeat request (HARD) identifier, a new data indicator (NDI), a redundancy version (NV), and channel occupancy time sharing information (Channel Occupancy Time (COT) sharing information). It should be further noted that the target parameter is used for determining the number of resource elements (RE) to be occupied by the uplink control information in the configured grant PUSCH.

Step 102: Determine positions of REs to be occupied by each type of uplink control information in the at least one type of uplink control information.

Step 103: Based on the number of REs and the positions of REs, send the at least one type of uplink control information through the configured grant PUSCH.

It should be noted that the terminal determines the number of REs occupied by the uplink control information in the configured grant PUSCH and the positions of REs, and transmits the uplink control information based on the determined number of REs and the positions of REs; and the network-side device receives the uplink control information in the same manner, so as to ensure that the terminal and the network-side device have consistent understanding on the uplink control information.

It should be noted that the number of REs occupied by the uplink control information in the configured grant PUSCH is the number of REs at each layer, that is, when the PUSCH supports multi-layer transmission, each layer of the PUSCH maps the uplink control information in the same manner, and the number of REs to be occupied by the uplink control information in the configured grant PUSCH may also be the number of coded modulation symbols (the number of coded modulation symbols) per layer for transmitting the uplink control information. For example, the number of REs occupied by HARQ-ACK in the configured grant PUSCH may also be the number of coded modulation symbols per layer for HARQ-ACK transmission (the number of coded modulation symbols per layer for HARQ-ACK transmission).

It should be noted that in an NRU system, both a PUCCH and the configured grant PUSCH can work in an unlicensed band. When the PUCCH and the configured grant PUSCH both work in the unlicensed band, if the configured grant PUSCH and the PUCCH overlap in time domain and meet a specific time requirement, the terminal needs to multiplex the UCI on the PUCCH to the configured grant PUSCH for transmission. Therefore, the at least one type of uplink control information in this embodiment of this disclosure may further include second control information.

Specifically, the second control information includes at least one of hybrid automatic repeat request acknowledgement (HARQ-ACK) and channel state information (CSI).

It should be noted that during specific transmission, different parts of the CSI may be placed in different positions, and the CSI is divided into a first part (part 1) and a second part (part 2).

It should be noted that a specific implementation of step 101 is manner 1 or manner 2.

Manner 1: In a case that the configured grant PUSCH is type 1, obtain identification information corresponding to each type of uplink control information in the at least one type of uplink control information and configured by using radio resource control (RRC); and based on the identification information, determine a target parameter corresponding to the identification information of each type of uplink control information in the at least one type of uplink control information.

It should be noted that for type 1, the configured grant PUSCH is configured by using RRC and sent periodically. In this case, the identification information corresponding to each type of uplink control information is directly configured for the terminal by using RRC. During configuration, the network-side device may use the same RRC information element (IE) to configure all uplink control information in the at least one type of uplink control information, or use different RRC IEs to configure the uplink control information in the at least one type of uplink control information. During configuration, the network-side device may separately configure each type of uplink control information, or may jointly configure all or part of the uplink control information in the at least one type of uplink control information.

For example, for the type-1 configured grant PUSCH, target parameters (betaoffset) corresponding to CG-UCI, HARQ-ACK, CSI part 1, and CSI part 2 are separately configured by using RRC. Specifically, what is configured by using RRC is the identification information (namely, an offset index) corresponding to the target parameters. The HARQ-ACK is classified into being less than or equal to 2 bits, being greater than 2 bits, being less than or equal to 11 bits, and being greater than 11 bits. CSI part 1 and CSI part 2 are further classified into being less than or equal to 11 bits and being greater than 11 bits. Specifically, the RRC is used to separately configure identification information $(I_{offset}^{CG\text{-}UCI})$ corresponding to the target parameter corresponding to the CG-UCI, identification information $(I_{offset,0}^{HARQ\text{-}ACK})$ corresponding to the target parameter corresponding to the HARQ-ACK less than or equal to 2 bits, identification information $(I_{offset,1}^{HARQ\text{-}ACK})$ corresponding to the target parameter corresponding to the HARQ-ACK greater than 2 bits and less than or equal to 11 bits, identification information $(I_{offset,2}^{HARQ\text{-}ACK})$ corresponding to the target parameter corresponding to the HARQ-ACK greater than 11 bits, identification information $(I_{offset,0}^{CSI\text{-}1})$ corresponding to the target parameter corresponding to CSI part 1 less than or equal to 11 bits, identification information ($I_{offset,0}^{CSI-2}$) corresponding to the target parameter corresponding to CSI part 2 less than or equal to 11 bits, identification information ($I_{offset,1}^{CSI-1}$) corresponding to the target parameter corresponding to CSI part 1 greater than 11 bits, and identification information ($I_{offset,1}^{CSI-2}$) corresponding to the target parameter corresponding to the CSI part 2 greater than 11 bits. Then, the terminal determines a corresponding target parameter based on a table (refer to Table 1 to Table 3 below) of correspondence between the identification information corresponding to CG-UCI, HARQ-ACK, and CSI and the specific values of the target parameters.

It should be noted here that the CG-UCI and HARQ-ACK/CSI may have the same correspondence table.

TABLE 1

Correspondence between offset indexes and specific values of betaoffset corresponding to CG-UCI

| $I_{offset}^{CG-UCI}$ | $\beta_{offset}^{CG-UCI}$ |
| --- | --- |
| 0 | 1.000 |
| 1 | 2.000 |
| 2 | 2.500 |
| . . . | . . . |
| 30 | Reserved |
| 31 | Reserved |

TABLE 2

Correspondence between offset indexes and specific values of betaoffset corresponding to HARQ-ACK

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
| --- | --- |
| 0 | 1.000 |
| 1 | 2.000 |
| 2 | 2.500 |
| . . . | . . . |
| 30 | Reserved |
| 31 | Reserved |

TABLE 3

Correspondence between offset indexes and specific values of betaoffset corresponding to CSI

| $I_{offset,0}^{CSI-1}$ or $I_{offset,1}^{CSI-2}$ $I_{offset,0}^{CSI-2}$ or $I_{offset,1}^{CSI-2}$ | $\beta_{offset}^{CSI-1}$ $\beta_{offset}^{CSI-2}$ |
| --- | --- |
| 0 | 1.125 |
| 1 | 1.250 |
| 2 | 1.375 |
| . . . | . . . |
| 30 | Reserved |
| 31 | Reserved |

Manner 2: In a case that the configured grant PUSCH is type 2, if a configuration manner for a parameter indicated by RRC is a semi-static manner, obtain identification information corresponding to each type of uplink control information in the at least one type of uplink control information and configured by using RRC; or if a configuration manner for a parameter indicated by radio resource control RRC is a dynamic manner, obtain indication information in a parameter indicator field included in downlink control information DCI, and determine, based on the indication information, identification information corresponding to each type of uplink control information in the at least one type of uplink control information; and based on the identification information, determine a target parameter corresponding to the identification information of each type of uplink control information in the at least one type of uplink control information.

It should be noted that for type 2, the configured grant PUSCH is configured by using RRC and is activated/deactivated by using DCI. In this case, it is necessary to determine whether the configuration manner for the parameter indicated by the RRC is a semi-static or dynamic manner. In the semi-static manner, the network-side device may directly configure, by using RRC, the identification information corresponding to each type of uplink control information in the at least one type of uplink control information. In the dynamic manner, the network-side device needs to use indication information in a parameter indicator field included in the DCI to indicate the identification information corresponding to each type of uplink control information in the at least one type of uplink control information.

Specifically, during configuration, in the semi-static manner, the network-side device may use the same RRC IE to configure all the uplink control information in the at least one type of uplink control information, or use different RRC IEs to configure the uplink control information in the at least one type of uplink control information. During configuration, the network-side device may separately configure each type of uplink control information, or may jointly configure all the uplink control information in the at least one type of uplink control information. In the dynamic manner, the network-side device may use the same field in DCI to configure all the uplink control information in the at least one type of uplink control information, or use different fields in the DCI to configure the uplink control information in the at least one type of uplink control information. In addition, when each type of uplink control information is separately configured, the following is further included: indication information of the first control information is configured by using RRC, and indication information of the second control information is indicated by using the DCI; or the indication information of the second control information is configured by using RRC, and the indication information of the first control information is indicated by the DCI.

For example, ConfiguredGrantConfig includes an IE uci-OnPUSCH. When the parameter is configured in a semi-static manner, the RRC is used to configure the target parameter corresponding to each type of uplink control information in the at least one type of uplink control information. When the parameter is configured in a dynamic manner, the DCI for activating the type-2 CG-PUSCH includes a parameter indicator field (beta_offset indicator field), indicating the target parameter of the at least one type of uplink control information. Specifically, each codepoint in the beta_offset indicator field corresponds to a combination of target parameters of CG-UCI, HARQ-ACK, CSI part 1, and CSI part 2. Refer to Table 4 below.

TABLE 4

Correspondence between offset indexes and specific values of betaoffset for each type of uplink control information

| beta_offset indicator | $(I_{offset}^{CG-UCI})$, $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '00' | 1st offset index provided by higher layers |
| '01' | 2nd offset index provided by higher layers |
| '10' | 3rd offset index provided by higher layers |
| '11' | 4th offset index provided by higher layers |

It should be further noted that the network-side device may separately configure the first control information and the second control information, for example, using different RRC or DCI to configure the first control information and the second control information, that is, during configuration, one piece of RRC includes only a configuration for the first control information, and the other piece of RRC includes only a configuration for the second control information.

For example, for the type-2 configured grant PUSCH, the RRC is used to configure betaoffset of the first control information, or the DCI indicates betaoffset of the first control information. For example, in a method in which the DCI indicates betaoffset of the first control information, four CG-UCI offsets are first configured by using RRC, and then are indicated by using two bits (CG-UCI betaoffset indicator) in the DCI for activating the type-2 CG-PUSCH, as shown in Table 5 below:

TABLE 5

Correspondence between offset indexes and specific values of betaoffset corresponding to CG-UCI

| beta_offset indicator | $(I_{offset}^{CG-UCI})$ |
|---|---|
| '00' | 1st offset index provided by higher layers |
| '01' | 2nd offset index provided by higher layers |
| '10' | 3rd offset index provided by higher layers |
| '11' | 4th offset index provided by higher layers |

A configuration status of betaoffset for the second control information by the network-side device is similar to that for the first control information, as shown in Table 6 below.

TABLE 6

Correspondence between offset indexes and specific values of betaoffset corresponding to the second control information

| beta_offset indicator | $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '00' | 1st offset index provided by higher layers |
| '01' | 2nd offset index provided by higher layers |
| '10' | 3rd offset index provided by higher layers |
| '11' | 4th offset index provided by higher layers |

It should be noted that after the identification information corresponding to each type of uplink control information is obtained, the number of REs occupied by the uplink control information in the configured grant PUSCH needs to be determined based on the identification information. Determining the number of REs for the first control information is used as an example, and specific implementations in this embodiment of this disclosure are described below.

Based on the determined target parameter ($\beta_{offset}^{CG-UCI}$) of the first control information, the number of REs occupied by the CG-UCI may be determined according to the following formula:

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symbol,all}^{CG-PUSCH}-1} M_{SC}^{UCI}(l)}{\sum_{r=0}^{C_{UL-SCH}-1} K_r} \right\rceil, \alpha \sum_{l=l_0}^{N_{symbol,all}^{CG-PUSCH}-1} M_{SC}^{UCI}(l) \right\};$$

or $$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symbol,all}^{CG-PUSCH}-1} M_{SC}^{UCI}(l)}{\sum_{r=0}^{C_{UL-SCH}-1} K_r} \right\rceil, \sum_{l=l_0}^{N_{symbol,all}^{CG-PUSCH}-1} M_{SC}^{UCI}(l) \right\};$$

where $O_{CG-UCI}$ represents the number of bits of the first control information; $L_{CG-UCI}$ represents the number of cyclic redundancy check (CRC) bits of the first control information; $\beta_{offset}^{PUSCH} = \beta_{offset}^{CG-UCI}$ represents the target parameter of the first control information; $C_{UL-SCH}$ represents the number of UL-SCH code blocks (code blocks) transmitted by the PUSCH; $K_r$ represents a size of the r-th code block of the UL-SCH; $M_{sc}^{PUSCH}$ represents a bandwidth of PUSCH transmission, counted by subcarriers (subcarrier); $M_{sc}^{PT-RS}(l)$ represents a subcarrier used by a phase tracking reference signal (PTRS) in the OFDM symbol l in PUSCH transmission; $M_{sc}^{UCI}(l)$ is the number of REs available for UCI transmission on the OFDM symbol l in PUSCH transmission; $l=0, 1, 2, \ldots, N_{symball}^{PUSCH}-1$; $N_{symball}^{PUSCH}$ represents a total number of OFDM symbols included in CG-PUSCH transmission, including symbols used for DMRS; $M_{sc}^{UCI}(l)=0$ for OFDM symbols including a DMRS, and $M_{sc}^{UCI}(l)=M_{sc}^{PUSCH}-M_{sc}^{PT-RS}(l)$ for OFDM symbols not including a DMRS; $l_0$ indicates an index of an OFDM symbol to which the CG-UCI starts to be mapped, that is, an index of the first symbol not including a DMRS after the first DMRS; and a is a parameter scaling configured by using RRC.

The number of REs occupied by HARQ-ACK may be determined according to the following formula:

$$Q'_{ACK} = \min\left\{ \left\lceil \frac{(O_{ACK} + L_{ACK}) \cdot \beta_{offset}^{PUSCH} \cdot \sum_{l=0}^{N_{symball}^{PUSCH}-1} M_{SC}^{UCI}(l)}{\sum_{r=0}^{C_{UL-SCH}-1} K_r} \right\rceil, \left\lceil \alpha \cdot \sum_{l=l_0}^{N_{symball}^{PUSCH}-1} M_{SC}^{UCI}(l) - Q'_{CG-UCI} \right\rceil \right\};$$

where $\beta_{offset}^{PUSCH} = \beta_{offset}^{HARQ-ACK}$ and $l_0$ represents an index of an OFDM symbol to which the HARQ-ACK starts to be mapped.

The number of REs occupied by CSI part 1 may be determined according to the following formula:

$$Q'_{CSI-1} = \min\left\{ \left\lceil \frac{(O_{CSI-1} + L_{CSI-1}) \cdot \beta_{offset}^{PUSCH}}{\sum_{l=0}^{N_{symb,all}^{PUSCH}-1} M_{SC}^{UCI}(l)} \right\rceil, \right.$$

$$\left. \left\lceil \alpha \cdot \sum_{l=0}^{N_{symb,all}^{PUSCH}-1} M_{SC}^{UCI}(l) \right\rceil - Q'_{CG-UCI} - Q'_{ACK} \right\};$$

where, $\beta_{offset}^{PUSCH} = \beta_{offset}^{CSI-part1}$.

The number of REs occupied by CSI part 2 may be determined according to the following formula:

$$Q'_{CSI-2} = \min\left\{ \left\lceil \frac{(O_{CSI-2} + L_{CSI-2}) \cdot \beta_{offset}^{PUSCH}}{\sum_{l=0}^{N_{symb,all}^{PUSCH}-1} M_{SC}^{UCI}(l)} \right\rceil, \right.$$

$$\left. \left\lceil \alpha \cdot \sum_{l=0}^{N_{symb,all}^{PUSCH}-1} M_{SC}^{UCI}(l) \right\rceil - Q'_{CG-UCI} - Q'_{ACK} - Q'_{CSI-1} \right\};$$

where, $\beta_{offset}^{PUSCH} = \beta_{offset}^{CSI-part2}$.

Further, a specific implementation of step 102 in this embodiment of this disclosure is as follows:

mapping each type of uplink control information in the at least one type of uplink control information on the configured grant PUSCH by using a frequency-first mapping rule; and determining, based on a mapping relationship, the positions of REs to be occupied by each type of uplink control information in the at least one type of uplink control information.

It should be noted that, from the perspective that the at least one type of uplink control information includes different information, the following specifically describes a mapping manner of each type of uplink control information in this embodiment of this disclosure.

Case 1: The at least one type of uplink control information includes only the first control information.

Specifically, in this case, a specific implementation of mapping each type of uplink control information in the at least one type of uplink control information to the configured grant PUSCH includes one of the following manners:

Manner 1: Map the first control information starting from the first usable non-DMRS OFDM symbol after the first demodulation reference signal DMRS orthogonal frequency division multiplexing OFDM symbol for transmission of the configured grant PUSCH.

It should be noted that mapping the first control information to positions adjacent to the DMRS symbol can improve accuracy of channel estimation, thereby improving reliability of CG-UCI transmission.

Manner 2: Map the first control information starting from the first usable non-DMRS OFDM symbol for transmission of the configured grant PUSCH.

Case 2: The at least one type of uplink control information includes the first control information and the second control information, and the second control information includes only HARQ-ACK.

Specifically, in this case, a specific implementation of mapping each type of uplink control information in the at least one type of uplink control information to the configured grant PUSCH includes one of the following manners:

Manner 1: Map the first control information and the HARQ-ACK starting from the first usable non-DMRS OFDM symbol after the first demodulation reference signal DMRS orthogonal frequency division multiplexing OFDM symbol for transmission of the configured grant PUSCH, where the first control information and the HARQ-ACK are mapped to different REs.

Specifically, a first specific mapping manner of the first control information and HARQ-ACK is: first mapping the first control information starting from the first usable non-DMRS OFDM symbol after the first DMRS OFDM symbol for transmission of the configured grant PUSCH; and mapping the HARQ-ACK starting from the first usable non-DMRS OFDM symbol after the first DMRS OFDM symbol for transmission, where the HARQ-ACK cannot be mapped to the REs occupied by the first control information. In this manner, the first control information is mapped before the HARQ-ACK.

Specifically, a second specific mapping manner of the first control information and HARQ-ACK is: first mapping the HARQ-ACK starting from the first usable non-DMRS OFDM symbol after the first DMRS OFDM symbol for transmission of the configured grant PUSCH; and mapping the first control information starting from the first usable non-DMRS OFDM symbol after the first DMRS OFDM symbol for transmission, where the first control information cannot be mapped to the REs occupied by the HARQ-ACK. In this manner, the HARQ-ACK is mapped before the first control information.

It should be noted that the first control information cannot be mapped to the REs occupied by the HARQ-ACK, and the REs occupied by the HARQ-ACK include: REs reserved for the HARQ-ACK when the HARQ-ACK is less than or equal to 2 bits, or REs occupied by the HARQ-ACK in a rate matching manner when the HARQ-ACK is greater than 2 bits.

It should be noted that mapping the first control information and the HARQ-ACK to positions adjacent to the DMRS symbol can improve accuracy of channel estimation, thereby improving reliability of CG-UCI and HARQ-ACK transmission.

Manner 2: Map the first control information starting from the first usable non-DMRS OFDM symbol for transmission of the configured grant PUSCH, and mapping the HARQ-ACK starting from the first usable non-DMRS OFDM symbol after the first DMRS OFDM symbol for transmission of the configured grant PUSCH; where the first control information and the HARQ-ACK are mapped to different REs.

Case 3: The at least one type of uplink control information includes the first control information and the second control information, and the second control information includes only CSI.

Specifically, in this case, a specific implementation of mapping each type of uplink control information in the at least one type of uplink control information to the configured grant PUSCH includes one of the following manners:

Manner 1: Map the first control information starting from the first usable non-DMRS OFDM symbol after the first DMRS OFDM symbol for transmission of the configured grant PUSCH, and map the CSI starting from the first usable non-DMRS OFDM symbol for the configured grant PUSCH, where the CSI is mapped to REs other than REs occupied by the first control information.

Manner 2: Map the first control information starting from the first usable non-DMRS OFDM symbol for transmission of the configured grant PUSCH, and map the CSI starting from the first usable non-DMRS OFDM symbol for the configured grant PUSCH, where the CSI is mapped to REs other than REs occupied by the first control information.

It should be noted that in this case, the first control information is mapped before the CSI.

Case 4: The at least one type of uplink control information includes the first control information and the second control information, and the second control information includes the HARQ-ACK and CSI.

Specifically, mapping each type of uplink control information in the at least one type of uplink control information to the configured grant PUSCH may be performed in one of the following manners:

Manner 1: Map the first control information and the HARQ-ACK starting from the first usable non-DMRS OFDM symbol after the first DMRS OFDM symbol for transmission of the configured grant PUSCH, and map the CSI starting from the first usable non-DMRS OFDM symbol for the configured grant PUSCH, where the CSI is mapped to REs other than REs occupied by the first control information and the HARQ-ACK.

Further, the first control information and the HARQ-ACK are mapped starting from the first usable non-DMRS OFDM symbol after the first DMRS OFDM symbol for transmission of the configured grant PUSCH in the following specific implementation:

mapping first target information starting from the first usable non-DMRS OFDM symbol after the first DMRS OFDM symbol for transmission of the configured grant PUSCH, and mapping second target information starting from the first usable non-DMRS OFDM symbol after the first DMRS OFDM symbol for transmission, where the second target information is mapped to REs other than REs occupied by the first target information; where the first target information is the first control information, and the second target information is the HARQ-ACK; or the first target information is the HARQ-ACK, and the second target information is the first control information.

A first specific mapping manner of the first control information and HARQ-ACK is: first mapping the first control information starting from the first usable non-DMRS OFDM symbol after the first DMRS OFDM symbol for transmission of the configured grant PUSCH; and mapping the HARQ-ACK starting from the first usable non-DMRS OFDM symbol after the first DMRS OFDM symbol for transmission, where the HARQ-ACK cannot be mapped to the REs occupied by the first control information. In this manner, the first control information is mapped before the HARQ-ACK.

Figure 2:
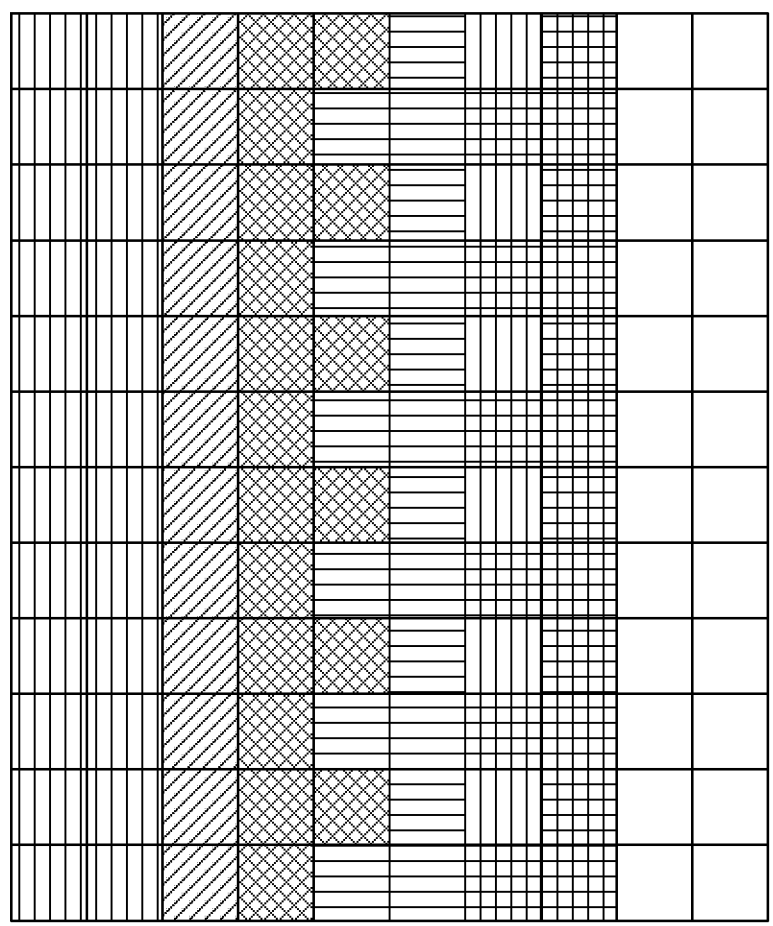
FIG. 2 illustrates a first mapping manner of different types of UCI.

It should be noted that in CG-PUSCH transmission, the network-side device can decode the UL-SCH correctly only when the first control information is correctly decoded. Therefore, reliability of the CG-UCI transmission needs to be guaranteed. In this manner, mapping the first control information to positions adjacent to the DMRS symbol can improve accuracy of channel estimation, thereby improving reliability of the CG-UCI transmission. In addition, transmission of other types of UCI needs to be ensured to a greatest extent. As shown in FIG. 2, there are different types of UCI mapping manners. When the number of REs available for an OFDM symbol are greater than the number of REs required for UCI mapping, the UCI may be mapped in a distributed manner to obtain frequency division gains to some extent.

A second specific mapping manner of the first control information and HARQ-ACK is: first mapping the HARQ-ACK starting from the first usable non-DMRS OFDM symbol after the first DMRS OFDM symbol for transmission of the configured grant PUSCH; and mapping the first control information starting from the first usable non-DMRS OFDM symbol after the first DMRS OFDM symbol for transmission, where the first control information cannot be mapped to the REs occupied by the HARQ-ACK. In this manner, the HARQ-ACK is mapped before the first control information.

Figure 3:
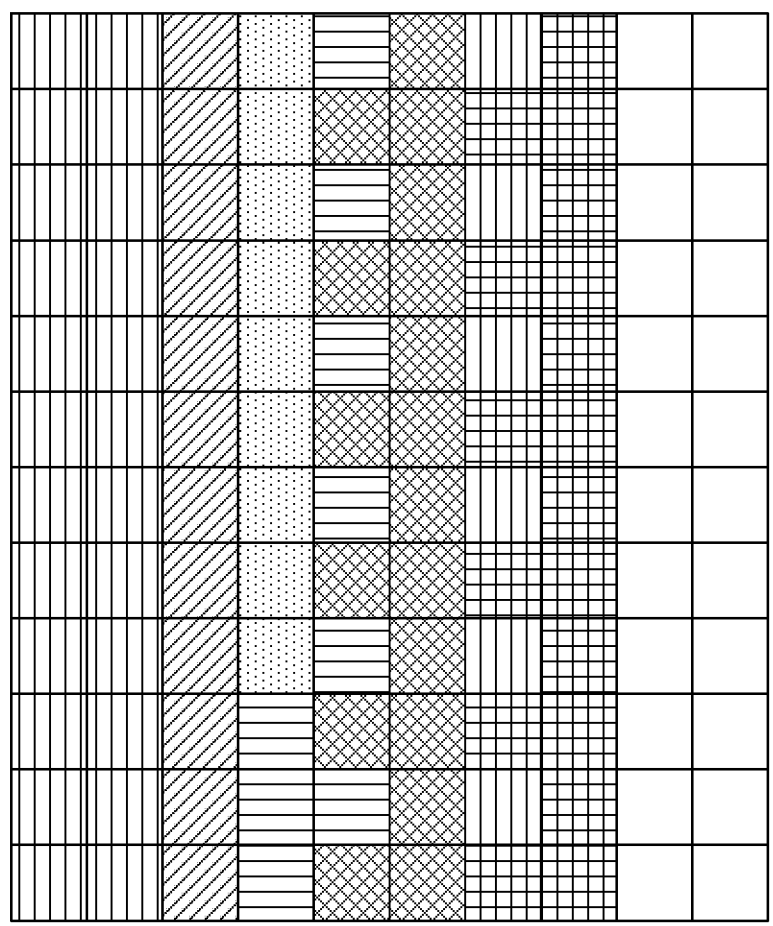
FIG. 3 illustrates a second mapping manner of different types of UCI.

As shown in FIG. 3, the HARQ-ACK is less than 3 bits, and the terminal determines, based on the 2-bit HARQ-ACK, the REs reserved for the HARQ-ACK, and maps the CG-UCI behind the HARQ-ACK resource, where the CG-UCI cannot be mapped to REs reserved for the HARQ-ACK.

It should be noted that, in FIG. 2 and FIG. 3, a left-oblique-lined box is a RE occupied by DMRS, a left- and right-oblique-lined box is a RE occupied by the first control information, a horizontal-lined box is a RE occupied by HARQ-ACK, a vertical-lined box is a RE occupied by CSI part 1, a horizontal-lined and vertical-lined box is a RE occupied by CSI part 2, and a blank box is a RE occupied by UL-SCH. Specifically, a dotted box in FIG. 3 is a RE reserved for HARQ-ACK.

After mapping of the first control information and HARQ-ACK is completed, the CSI is mapped. Specifically, the CSI is mapped starting from the first usable non-DMRS OFDM symbol for the configured grant PUSCH, and an implementation of mapping the CSI to REs other than the REs occupied by the first control information and the HARQ-ACK is:

mapping a first part and a second part of the CSI separately starting from the first usable non-DMRS OFDM symbol for the configured grant PUSCH; where the first part is mapped to REs other than the REs occupied by the first control information and the HARQ-ACK; in a case that a bit length of the HARQ-ACK is less than a first preset value, the second part is able to be mapped to REs reserved for the HARQ-ACK; and in a case that the bit length of the HARQ-ACK is greater than a second preset value, the second part is mapped to REs other than REs occupied by the HARQ-ACK in a rate matching manner.

The first preset value is 3 bits, and the second preset value is 2 bits.

It should be noted that, in this case, CSI part 1 and CSI part 2 each are mapped starting from the first available non-DMRS symbol, and CSI part 1 cannot be mapped to the REs in which the first control information and the HARQ-ACK are located (including REs reserved for the HARQ-ACK in a case that a bit length of the HARQ-ACK is less than 3 bits, and REs occupied by the HARQ-ACK in a rate matching manner in a case that a bit length of the HARQ-ACK is greater than 2 bits). In the case that the bit length of the HARQ-ACK is less than 3 bits, CSI part 2 can be mapped to the REs reserved by the HARQ-ACK. In the case that the bit length of the HARQ-ACK is greater than 2 bits, CSI part 2 cannot be mapped to the REs occupied by the HARQ-ACK in a rate matching manner.

Manner 2: Map the first control information starting from the first available non-demodulation reference signal DMRS orthogonal frequency division multiplexing OFDM symbol for transmission of the configured grant PUSCH, where the first control information is mapped to the REs other than the REs occupied by the HARQ-ACK; and map the CSI starting from the first usable non-DMRS OFDM symbol for the configured grant PUSCH, where the CSI is mapped to REs other than REs occupied by the first control information and the HARQ-ACK.

It should be noted that, in this manner, the first control information is mapped starting from the first available non-demodulation reference signal DMRS orthogonal frequency division multiplexing OFDM symbol for transmission of the configured grant PUSCH, and the first control information cannot be mapped to the REs occupied by the HARQ-ACK; and the CSI is mapped starting from the first usable non-DMRS OFDM symbol for the configured grant PUSCH, and the CSI cannot be mapped to the REs occupied by the first control information and HARQ-ACK.

It should be noted that the first DMRS symbol may be the first DMRS symbol used or configured for actual PUSCH transmission, or the first DMRS symbol configured after the last start symbol position configured when the CG-PUSCH supports a plurality of start symbol positions.

In this embodiment of this disclosure, the target parameter of each type of uplink control information in the at least one type of uplink control information is obtained based on the type of the configured grant PUSCH, so as to assist in determining the number of resource elements REs to be occupied by the uplink control information in the configured grant PUSCH; and then based on the determined number of REs and the determined positions of REs, the least one type of uplink control information is transmitted on the configured grant PUSCH, so as to ensure that the uplink control information can be accurately transmitted on the configured grant PUSCH.

Figure 4:
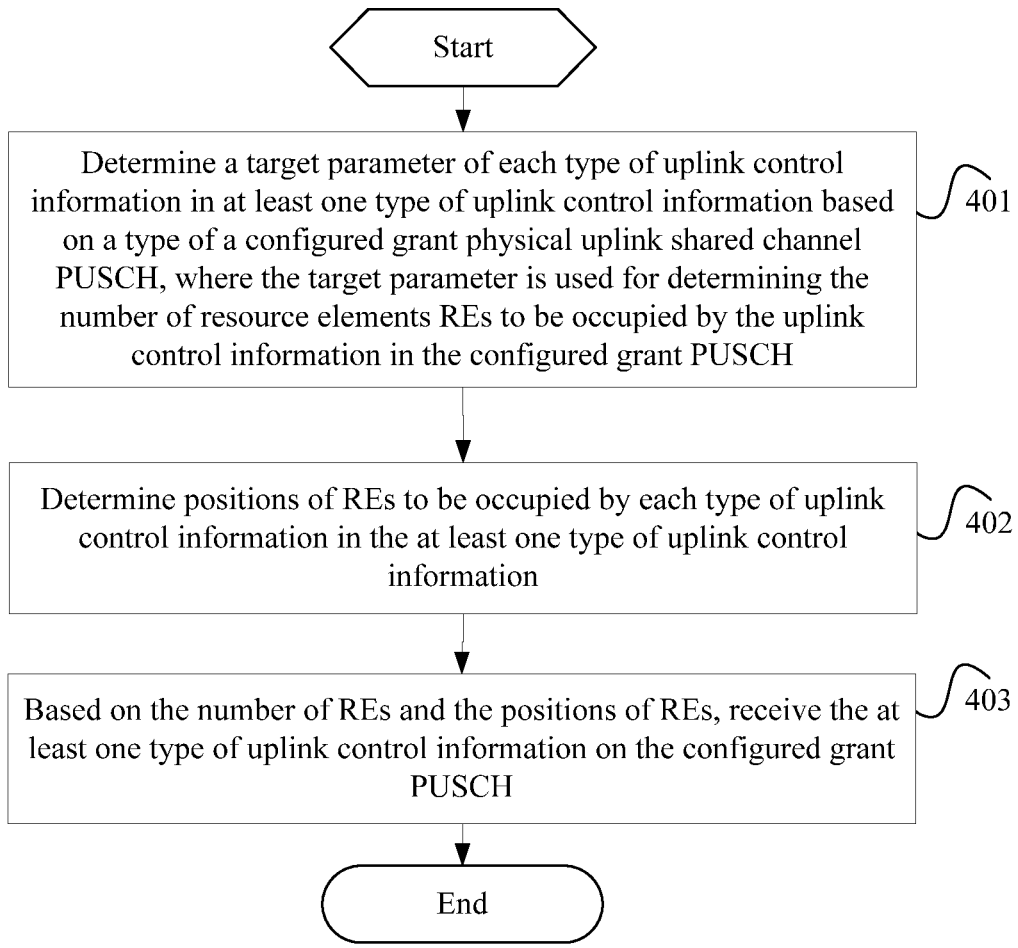
FIG. 4 is a schematic flowchart of a method for receiving uplink control information according to an embodiment of this disclosure.

As shown in FIG. 4, an embodiment of this disclosure provides a method for receiving uplink control information, applied to a network-side device and including:

Step 401: Determine a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH.

Step 402: Determine positions of REs to be occupied by each type of uplink control information in the at least one type of uplink control information.

Step 403: Based on the number of REs and the positions of REs, receive the at least one type of uplink control information on the configured grant PUSCH.

The at least one type of uplink control information includes first control information.

Specifically, the first control information is configured grant uplink control information.

Further, the at least one type of uplink control information further includes second control information.

The second control information includes at least one of hybrid automatic repeat request acknowledgement HARQ-ACK and channel state information CSI.

Optionally, before the target parameter of each type of uplink control information in the at least one type of uplink control information is determined based on the type of the configured grant physical uplink shared channel PUSCH, the following is further included:

in a case that the configured grant PUSCH is type 1, configuring, for a terminal by using radio resource control RRC, identification information corresponding to each type of uplink control information in the at least one type of uplink control information; where the identification information is used to assist the terminal in obtaining the target parameter of each type of uplink control information in the at least one type of uplink control information.

Optionally, before the target parameter of each type of uplink control information in the at least one type of uplink control information is determined based on the type of the configured grant physical uplink shared channel PUSCH, the following is further included:

in a case that the configured grant PUSCH is type 2, if it is determined that a configuration manner for a parameter indicated by radio resource control RRC is a semi-static manner, configuring, for a terminal by using RRC, identification information corresponding to each type of uplink control information in the at least one type of uplink control information; or if a configuration manner for a parameter indicated by RRC is a dynamic manner, sending downlink control information DCI to the terminal, where a parameter indicator field of the DCI includes indication information; and the indication information is used to indicate the identification information corresponding to each type of uplink control information in the at least one type of uplink control information, and the identification information is used to assist the terminal in obtaining the target parameter of each type of uplink control information in the at least one type of uplink control information.

Specifically, the determining positions of REs to be occupied by each type of uplink control information in the at least one type of uplink control information includes:

mapping each type of uplink control information in the at least one type of uplink control information on the configured grant PUSCH by using a frequency-first mapping rule; and determining, based on a mapping relationship, the positions of REs to be occupied by each type of uplink control information in the at least one type of uplink control information.

Optionally, the mapping each type of uplink control information in the at least one type of uplink control information on the configured grant PUSCH includes:

mapping the first control information starting from the first usable non-DMRS OFDM symbol after the first demodulation reference signal DMRS orthogonal frequency division multiplexing OFDM symbol for transmission of the configured grant PUSCH; or mapping the first control information starting from the first usable non-DMRS OFDM symbol for transmission of the configured grant PUSCH.

Optionally, the at least one type of uplink control information further includes second control information, and the second control information includes hybrid automatic repeat request acknowledgement HARQ-ACK; and the mapping each type of uplink control information in the at least one type of uplink control information on the configured grant PUSCH includes:

mapping the first control information and the HARQ-ACK starting from the first usable non-DMRS OFDM symbol after the first demodulation reference signal DMRS orthogonal frequency division multiplexing OFDM symbol for transmission of the configured grant PUSCH; or mapping the first control information starting from the first usable non-DMRS OFDM symbol for transmission of the configured grant PUSCH, and mapping the HARQ-ACK starting from the first usable non-DMRS OFDM symbol after the first DMRS OFDM symbol for transmission of the configured grant PUSCH; where the first control information and the HARQ-ACK are mapped to different REs.

Further, the mapping the first control information and the HARQ-ACK starting from the first usable non-DMRS OFDM symbol after the first demodulation reference signal DMRS orthogonal frequency division multiplexing OFDM symbol for transmission of the configured grant PUSCH includes:

mapping first target information starting from the first usable non-DMRS OFDM symbol after the first DMRS OFDM symbol for transmission of the configured grant PUSCH, and mapping second target information starting from the first usable non-DMRS OFDM symbol after the first DMRS OFDM symbol for transmission, where the second target information is mapped to REs other than REs occupied by the first target information; where the first target information is the first control information, and the second target information is the HARQ-ACK; or the first target information is the HARQ-ACK, and the second target information is the first control information.

Further, in a case that the second control information further includes channel state information CSI, the mapping each type of uplink control information in the at least one type of uplink control information on the configured grant PUSCH further includes:

mapping the CSI starting from the first usable non-DMRS OFDM symbol for the configured grant PUSCH, where the CSI is mapped to REs other than REs occupied by the first control information and the HARQ-ACK.

Specifically, the mapping the CSI starting from the first usable non-DMRS OFDM symbol for the configured grant PUSCH, where the CSI is mapped to REs other than REs occupied by the first control information and the HARQ-ACK, includes:

mapping a first part and a second part of the CSI separately starting from the first usable non-DMRS OFDM symbol for the configured grant PUSCH; where the first part is mapped to REs other than the REs occupied by the first control information and the HARQ-ACK; in a case that a bit length of the HARQ-ACK is less than a first preset value, the second part is able to be mapped to REs reserved for the HARQ-ACK; and in a case that the bit length of the HARQ-ACK is greater than a second preset value, the second part is mapped to REs other than REs occupied by the HARQ-ACK in a rate matching manner.

Optionally, the at least one type of uplink control information further includes second control information, and in a case that the second control information further includes channel state information CSI, the mapping each type of uplink control information in the at least one type of uplink control information on the configured grant PUSCH further includes:

mapping the CSI starting from the first usable non-DMRS OFDM symbol for the configured grant PUSCH, where the CSI is mapped to REs other than REs occupied by the first control information.

It should be noted that all the descriptions related to the network-side device in the foregoing embodiment are applicable to the embodiment of the method for receiving uplink control information, with the same technical effects achieved.

Figure 5:
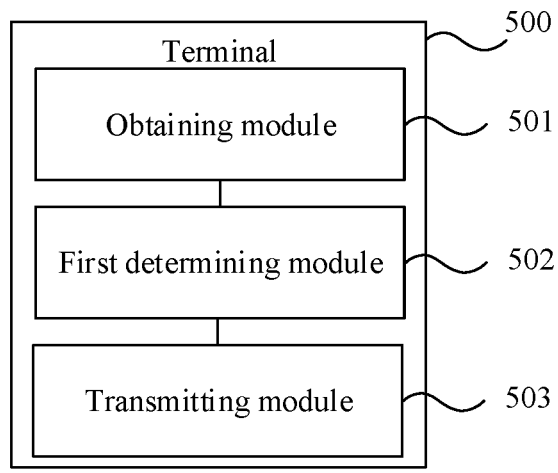
FIG. 5 is a schematic modular diagram of a terminal according to an embodiment of this disclosure.

As shown in FIG. 5, an embodiment of this disclosure provides a terminal 500, including:

an obtaining module 501, configured to obtain a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

a first determining module 502, configured to determine the positions of REs to be occupied by each type of uplink control information in the at least one type of uplink control information; and a transmitting module 503, configured to: based on the number of REs and the positions of REs, send the at least one type of uplink control information through the configured grant PUSCH; where the at least one type of uplink control information includes first control information.

Specifically, the first control information is configured grant uplink control information.

Further, the at least one type of uplink control information further includes second control information.

The second control information includes at least one of hybrid automatic repeat request acknowledgement HARQ-ACK and channel state information CSI.

Optionally, the obtaining module 501 includes:

a first obtaining unit, configured to: in a case that the configured grant PUSCH is type 1, obtain identification information corresponding to each type of uplink control information in the at least one type of uplink control information and configured by using radio resource control RRC; and a first determining unit, configured to: based on the identification information, determine a target parameter corresponding to the identification information of each type of uplink control information in the at least one type of uplink control information.

Optionally, the obtaining module 501 includes:

a second obtaining unit, configured to: in a case that the configured grant PUSCH is type 2, if a configuration manner for a parameter indicated by radio resource control RRC is a semi-static manner, obtain identification information corresponding to each type of uplink control information in the at least one type of uplink control information and configured by using RRC; or if a configuration manner for a parameter indicated by radio resource control RRC is a dynamic manner, obtain indication information in a parameter indicator field included in downlink control information DCI, and determine, based on the indication information, identification information corresponding to each type of uplink control information in the at least one type of uplink control information; and a second determining unit, configured to: based on the identification information, determine a target parameter corresponding to the identification information of each type of uplink control information in the at least one type of uplink control information.

Further, the first determining module includes:

a first mapping unit, configured to: map each type of uplink control information in the at least one type of uplink control information on the configured grant PUSCH by using a frequency-first mapping rule; and a third determining module, configured to determine, based on the mapping relationship, the positions of REs to be occupied by each type of uplink control information in the at least one type of uplink control information.

Optionally, the first mapping unit is configured to:

map the first control information starting from the first usable non-DMRS OFDM symbol after the first demodulation reference signal DMRS orthogonal frequency division multiplexing OFDM symbol for transmission of the configured grant PUSCH; or map the first control information starting from the first usable non-DMRS OFDM symbol for transmission of the configured grant PUSCH.

Optionally, the at least one type of uplink control information further includes second control information, and the second control information includes hybrid automatic repeat request acknowledgement HARQ-ACK. The first mapping unit is configured to:

map the first control information and the HARQ-ACK starting from the first usable non-DMRS OFDM symbol after the first demodulation reference signal DMRS orthogonal frequency division multiplexing OFDM symbol for transmission of the configured grant PUSCH; or map the first control information starting from the first usable non-DMRS OFDM symbol for transmission of the configured grant PUSCH, and mapping the HARQ-ACK starting from the first usable non-DMRS OFDM symbol after the first DMRS OFDM symbol for transmission of the configured grant PUSCH; where the first control information and the HARQ-ACK are mapped to different REs.

Further, an implementation of mapping the first control information and the HARQ-ACK starting from the first usable non-DMRS OFDM symbol after the first demodulation reference signal DMRS orthogonal frequency division multiplexing OFDM symbol for transmission of the configured grant PUSCH is:

mapping first target information starting from the first usable non-DMRS OFDM symbol after the first DMRS OFDM symbol for transmission of the configured grant PUSCH, and mapping second target information starting from the first usable non-DMRS OFDM symbol after the first DMRS OFDM symbol for transmission, where the second target information is mapped to REs other than REs occupied by the first target information; where the first target information is the first control information, and the second target information is the HARQ-ACK; or the first target information is the HARQ-ACK, and the second target information is the first control information.

Further, in a case that the second control information further includes channel state information CSI, the first mapping unit is further configured to:

map the CSI starting from the first usable non-DMRS OFDM symbol for the configured grant PUSCH, where the CSI is mapped to REs other than REs occupied by the first control information and the HARQ-ACK.

Specifically, a specific implementation of mapping the CSI starting from the first usable non-DMRS OFDM symbol for the configured grant PUSCH, where the CSI is mapped to REs other than REs occupied by the first control information and the HARQ-ACK is:

mapping a first part and a second part of the CSI separately starting from the first usable non-DMRS OFDM symbol for the configured grant PUSCH; where the first part is mapped to REs other than the REs occupied by the first control information and the HARQ-ACK; in a case that a bit length of the HARQ-ACK is less than a first preset value, the second part is able to be mapped to REs reserved for the HARQ-ACK; and in a case that the bit length of the HARQ-ACK is greater than a second preset value, the second part is mapped to REs other than REs occupied by the HARQ-ACK in a rate matching manner.

Optionally, the at least one type of uplink control information further includes second control information, and in a case that the second control information includes channel state information CSI, the first mapping unit is further configured to:

map the CSI starting from the first usable non-DMRS OFDM symbol for the configured grant PUSCH, where the CSI is mapped to REs other than REs occupied by the first control information.

It should be noted that the terminal embodiment is a terminal corresponding to the foregoing method for transmitting uplink control information applied to the terminal. All the implementations of the foregoing embodiment are applicable to the terminal embodiment, with the same technical effects achieved.

Figure 6:
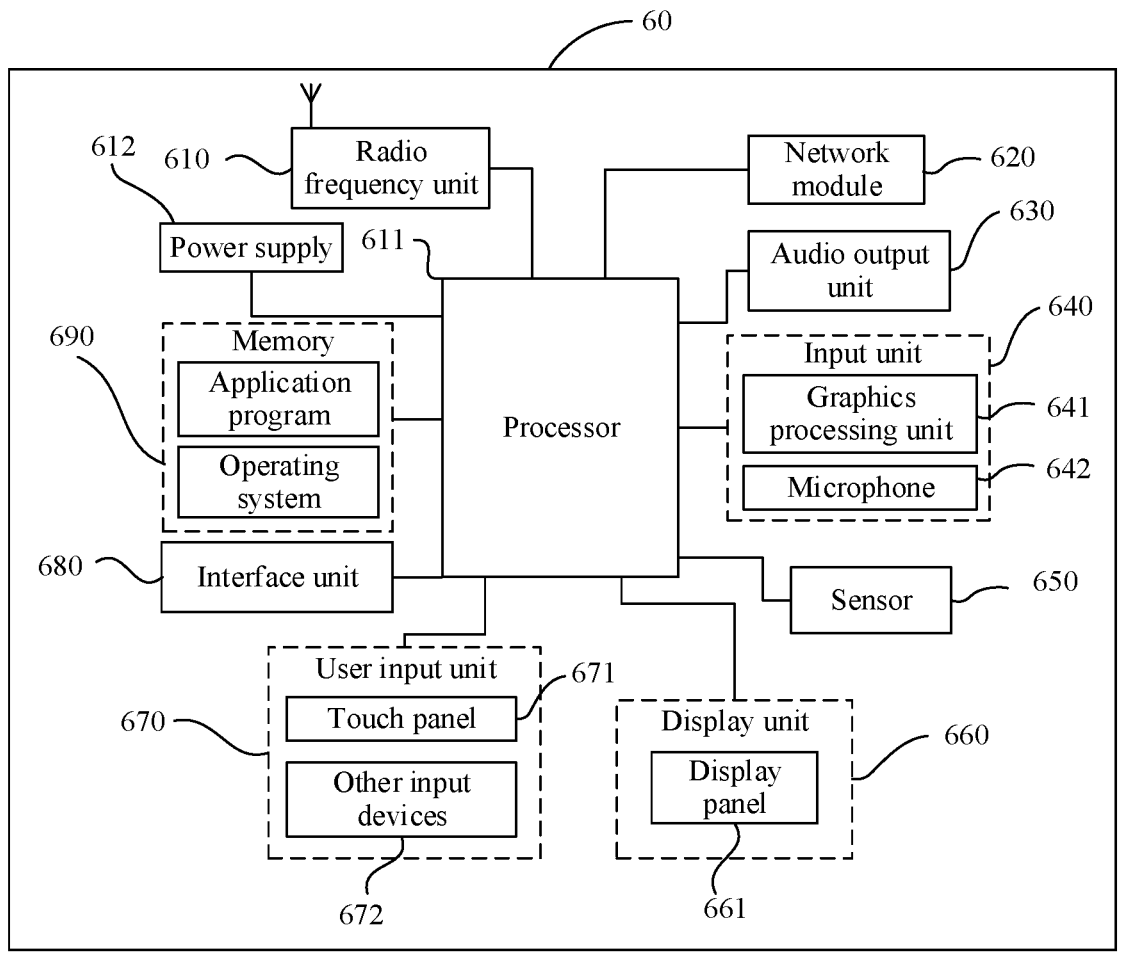
FIG. 6 is a structural block diagram of a terminal according to an embodiment of this disclosure.

FIG. 6 is a schematic diagram of a hardware structure of a terminal for implementing the embodiments of this disclosure.

The terminal 60 includes but is not limited to components such as a radio frequency unit 610, a network module 620, an audio output unit 630, an input unit 640, a sensor 650, a display unit 660, a user input unit 670, an interface unit 680, a memory 690, a processor 611, and a power supply 612. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The processor 611 is configured to obtain a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH; and determine the positions of REs to be occupied by each type of uplink control information in the at least one type of uplink control information.

The radio frequency unit 610 is configured to: based on the number of REs and the positions of REs, send the at least one type of uplink control information through the configured grant PUSCH; where the at least one type of uplink control information includes first control information.

The terminal in this embodiment of this disclosure obtains the target parameter of each type of uplink control information in the at least one type of uplink control information based on the type of the configured grant PUSCH, so as to assist in determining the number of resource elements REs to be occupied by the uplink control information in the configured grant PUSCH; and then based on the determined number of REs and the determined positions of REs, transmits the least one type of uplink control information on the configured grant PUSCH, so as to ensure that the uplink control information can be accurately transmitted on the configured grant PUSCH.

It should be understood that in this embodiment of this disclosure, the radio frequency unit 610 may be configured to receive and send information, or to receive and send a signal in a call process, and specially, after receiving downlink data from a network device, send the downlink data to the processor 611 for processing; and also send uplink data to the network device. Generally, the radio frequency unit 610 includes but is not limited to an antenna, at least one amplifier, a transceiver, a coupler, a low noise amplifier, a duplexer, and the like. In addition, the radio frequency unit 610 may also communicate with a network and other devices via a wireless communications system.

The terminal provides a user with wireless broadband internet access through the network module 620, for example, helping the user to transmit and receive e-mails, browse web pages, and access streaming media.

The audio output unit 630 may convert audio data received by the radio frequency unit 610 or the network module 620 or stored in the memory 690 into an audio signal and output the audio signal as a sound. Furthermore, the audio output unit 630 may also provide audio output (for example, a call signal received sound or a message received sound) related to a specific function performed by the terminal 60. The audio output unit 630 includes a speaker, a buzzer, a receiver, and the like.

The input unit 640 is configured to receive an audio or video signal. The input unit 640 may include a graphics processing unit (GPU) 641 and a microphone 642. The graphics processing unit 641 processes image data of a still picture or a video obtained by an image capture apparatus (for example, a camera) in an image capture mode or a video capture mode. A processed image frame may be displayed on the display unit 660. The image frame processed by the graphics processing unit 641 may be stored in the memory 690 (or another storage medium) or be transmitted by the radio frequency unit 610 or the network module 620. The microphone 642 is capable of receiving sounds and processing such sounds into audio data. The processed audio data can be converted into a format output that can be sent to a mobile communication network device through the radio frequency unit 610 in a telephone call mode.

The terminal 60 may further include at least one sensor 650, for example, an optical sensor, a motion sensor, and another sensor. Specifically, the optical sensor may include an ambient light sensor and a proximity sensor. The ambient light sensor may adjust luminance of the display panel 661 based on brightness of ambient light, and the proximity sensor may turn off the display panel 661 and/or backlight when the terminal 60 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 650 may also include a fingerprint sensor, a pressure sensor, an iris sensor, a molecular sensor, a gyroscope, a barometer, a hygrometer, a thermometer, an infrared sensor, and the like. Details are not described herein.

The display unit 660 is configured to display information input by the user or information provided to the user. The display unit 660 may include a display panel 661, and the display panel 661 may be configured in a form of a liquid crystal display (LCD), an organic light-emitting diode (OLED), or the like.

The user input unit 670 may be configured to receive input digit or character information and generate key signal input related to user setting and function control of the mobile terminal. Specifically, the user input unit 670 may include a touch panel 671 and other input devices 672. The touch panel 671 is also referred to as a touchscreen and can collect a touch operation (such as an operation performed by the user on the touch panel 671 or near the touch panel 671 with a finger or by using any proper object or accessory such as a stylus) of the user on or near the touch panel 671. The touch panel 671 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 611, and can receive a command transmitted by the processor 611 and execute the command. In addition, the touch panel 671 may be implemented in a plurality of forms, for example, as a resistive, capacitive, infrared, or surface acoustic wave touch panel. In addition to the touch panel 671, the user input unit 670 may further include other input devices 672. Specifically, the other input devices 672 may include but are not limited to a physical keyboard, a function key (such as a volume control key or an on/off key), a trackball, a mouse, and a joystick. Details are not described herein.

Further, the touch panel 671 may cover the display panel 661. When detecting a touch operation on or near the touch panel 671, the touch panel 661 transmits the touch operation to the processor 611 to determine a type of a touch event. Then, the processor 611 provides a corresponding visual output on the display panel 661 based on the type of the touch event. Although in FIG. 6, the touch panel 671 and the display panel 661 act as two independent parts to implement input and output functions of the terminal, in some embodiments, the touch panel 671 and the display panel 661 may be integrated to implement the input and output functions of the terminal. This is not specifically limited herein.

The interface unit 680 is an interface between an external apparatus and the terminal 60. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 680 may be configured to: receive input (for example, data information and power) from the external apparatus, and transmit the received input to one or more elements in the terminal 60, or may be configured to transmit data between the terminal 60 and the external apparatus.

The memory 690 may be configured to store software programs and various data. The memory 690 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 690 may include a high-speed random access memory, and may further include a non-volatile memory such as at least one disk storage device, a flash memory device, or another volatile solid-state storage device.

The processor 611 is a control center of the terminal, and is connected to all components of the terminal by using various interfaces and lines. By running or executing a software program and/or module that is stored in the memory 690 and calling data stored in the memory 690, the processor 611 executes various functions of the terminal and processes data, so as to perform overall monitoring on the terminal. The processor 611 may include one or more processing units. Optionally, an application processor and a modem processor may be integrated in the processor 611. The application processor primarily processes an operating system, user interfaces, application programs, and the like. The modem processor primarily processes radio communication. It can be understood that the modem processor may alternatively be not integrated in the processor 611.

The terminal 60 may further include the power supply 612 (for example, a battery) supplying power to all components. Optionally, the power supply 612 may be logically connected to the processor 611 through a power management system. In this way, functions such as charge management, discharge management, and power consumption management are implemented by using the power management system.

In addition, the terminal 60 includes some functional modules that are not shown. Details are not described herein.

Optionally, an embodiment of this disclosure further provides a terminal, including a processor 611, a memory 690, and a computer program stored in the memory 690 and running on the processor 611. When the computer program is executed by the processor 611, the processes of the foregoing embodiment of the method for transmitting uplink control information applied to the terminal side are implemented, with the same technical effects achieved. To avoid repetition, details are not described herein again.

An embodiment of this disclosure further provides a computer readable storage medium, where a computer program is stored in the computer readable storage medium. When the computer program is executed by a processor, the processes of the foregoing embodiment of the method for transmitting uplink control information applied to the terminal side are implemented, with the same technical effects achieved. To avoid repetition, details are not described herein again. The computer-readable storage medium is, for example, a read-only memory (ROM), a random access memory (RAM), a magnetic disk, or an optical disc.

Figure 7:
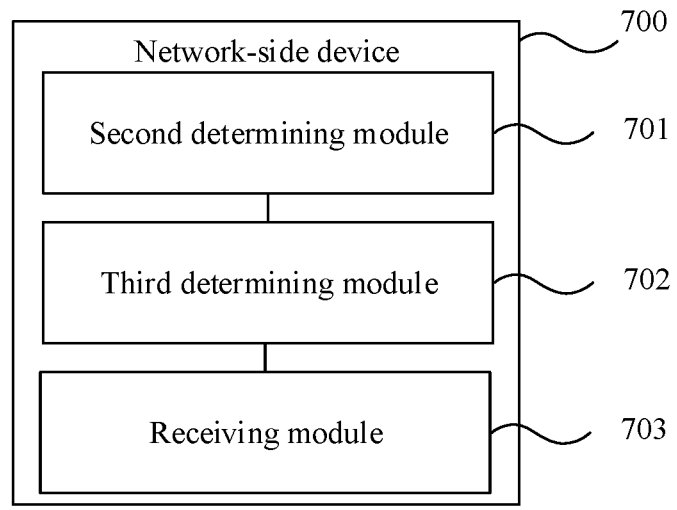
FIG. 7 is a schematic modular diagram of a network-side device according to an embodiment of this disclosure.

As shown in FIG. 7, an embodiment of this disclosure further provides a network-side device 700, including:

a second determining module 701, configured to determine a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

a third determining module 702, configured to determine the positions of REs to be occupied by each type of uplink control information in the at least one type of uplink control information; and a receiving module 703, configured to: based on the number of REs and the positions of REs, receive the at least one type of uplink control information on the configured grant PUSCH; where the at least one type of uplink control information includes first control information.

Specifically, the first control information is configured grant uplink control information.

Further, the at least one type of uplink control information further includes second control information.

The second control information includes at least one of hybrid automatic repeat request acknowledgement HARQ-ACK and channel state information CSI.

Optionally, before the target parameter of each type of uplink control information in the at least one type of uplink control information is determined based on the type of the configured grant physical uplink shared channel PUSCH, the second determining module 701 further includes:

a first configuration module, configured to: in a case that the configured grant PUSCH is type 1, configure, for a terminal by using radio resource control RRC, identification information corresponding to each type of uplink control information in the at least one type of uplink control information; where the identification information is used to assist the terminal in obtaining the target parameter of each type of uplink control information in the at least one type of uplink control information.

Optionally, before the target parameter of each type of uplink control information in the at least one type of uplink control information is determined based on the type of the configured grant physical uplink shared channel PUSCH, the second determining module 701 further includes:

a second configuration module, configured to: in a case that the configured grant PUSCH is type 2, if it is determined that a configuration manner for a parameter indicated by radio resource control RRC is a semi-static manner, configure, for a terminal by using RRC, identification information corresponding to each type of uplink control information in the at least one type of uplink control information; or if a configuration manner for a parameter indicated by RRC is a dynamic manner, send downlink control information DCI to the terminal, where a parameter indicator field of the DCI includes indication information; and the indication information is used to indicate the identification information corresponding to each type of uplink control information in the at least one type of uplink control information, and the identification information is used to assist the terminal in obtaining the target parameter of each type of uplink control information in the at least one type of uplink control information.

Further, the third determining module 702 includes:

a second mapping unit, configured to: map each type of uplink control information in the at least one type of uplink control information on the configured grant PUSCH by using a frequency-first mapping rule; and a fourth determining module, configured to determine, based on the mapping relationship, the positions of REs to be occupied by each type of uplink control information in the at least one type of uplink control information.

Optionally, the second mapping unit is configured to:

map the first control information starting from the first usable non-DMRS OFDM symbol after the first demodulation reference signal DMRS orthogonal frequency division multiplexing OFDM symbol for transmission of the configured grant PUSCH; or map the first control information starting from the first usable non-DMRS OFDM symbol for transmission of the configured grant PUSCH.

Optionally, the at least one type of uplink control information further includes second control information, and the second control information includes hybrid automatic repeat request acknowledgement HARQ-ACK. The second mapping unit is configured to:

map the first control information and the HARQ-ACK starting from the first usable non-DMRS OFDM symbol after the first demodulation reference signal DMRS orthogonal frequency division multiplexing OFDM symbol for transmission of the configured grant PUSCH; or map the first control information starting from the first usable non-DMRS OFDM symbol for transmission of the configured grant PUSCH, and mapping the HARQ-ACK starting from the first usable non-DMRS OFDM symbol after the first DMRS OFDM symbol for transmission of the configured grant PUSCH; where the first control information and the HARQ-ACK are mapped to different REs.

Further, an implementation of mapping the first control information and the HARQ-ACK starting from the first usable non-DMRS OFDM symbol after the first demodulation reference signal DMRS orthogonal frequency division multiplexing OFDM symbol for transmission of the configured grant PUSCH is:

mapping first target information starting from the first usable non-DMRS OFDM symbol after the first DMRS OFDM symbol for transmission of the configured grant PUSCH, and mapping second target information starting from the first usable non-DMRS OFDM symbol after the first DMRS OFDM symbol for transmission, where the second target information is mapped to REs other than REs occupied by the first target information; where the first target information is the first control information, and the second target information is the HARQ-ACK; or the first target information is the HARQ-ACK, and the second target information is the first control information.

Further, in a case that the second control information includes channel state information CSI, the second mapping unit is further configured to:

map the CSI starting from the first usable non-DMRS OFDM symbol for the configured grant PUSCH, where the CSI is mapped to REs other than REs occupied by the first control information and the HARQ-ACK.

Specifically, a specific implementation of mapping the CSI starting from the first usable non-DMRS OFDM symbol for the configured grant PUSCH, where the CSI is mapped to REs other than REs occupied by the first control information and the HARQ-ACK is:

mapping a first part and a second part of the CSI separately starting from the first usable non-DMRS OFDM symbol for the configured grant PUSCH; where the first part is mapped to REs other than the REs occupied by the first control information and the HARQ-ACK; in a case that a bit length of the HARQ-ACK is less than a first preset value, the second part is able to be mapped to REs reserved for the HARQ-ACK; and in a case that the bit length of the HARQ-ACK is greater than a second preset value, the second part is mapped to REs other than REs occupied by the HARQ-ACK in a rate matching manner.

Optionally, the at least one type of uplink control information further includes second control information, and in a case that the second control information includes channel state information CSI, the second mapping unit is further configured to:

map the CSI starting from the first usable non-DMRS OFDM symbol for the configured grant PUSCH, where the CSI is mapped to REs other than REs occupied by the first control information.

An embodiment of this disclosure further provides a network-side device, including a memory, a processor, and a computer program stored in the memory and capable of running on the processor. When the computer program is executed by the processor, the processes of the foregoing embodiment of the method for receiving uplink control information applied to the network-side device are implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for receiving uplink control information applied to the network-side device are implemented, with the same technical effects achieved. To avoid repetition, details are not described herein again. The computer-readable storage medium is, for example, a read-only memory (ROM), a random access memory (RAM), a magnetic disk, or an optical disc.

Figure 8:
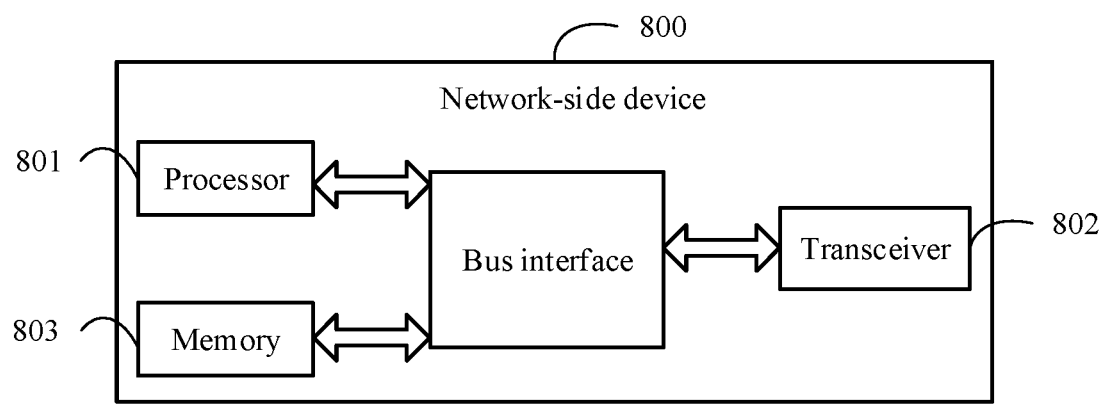
FIG. 8 is a structural block diagram of a network-side device according to an embodiment of this disclosure.

FIG. 8 is a structural diagram of a network-side device according to an embodiment of this disclosure, capable of implementing details of the foregoing method for receiving uplink control information, with the same effects achieved. As shown in FIG. 8, the network-side device 800 includes a processor 801, a transceiver 802, a memory 803, and a bus interface.

The processor 801 is configured to read a program in the memory 803 and execute the following process:

determining a target parameter of each type of uplink control information in at least one type of uplink control information based on a type of a configured grant physical uplink shared channel PUSCH, where the target parameter is used for determining the number of resource elements REs to be occupied by the uplink control information in the configured grant PUSCH;

determining positions of REs to be occupied by each type of uplink control information in the at least one type of uplink control information; and based on the number of REs and the positions of REs, receiving the at least one type of uplink control information on the configured grant PUSCH; where the at least one type of uplink control information includes first control information.

In FIG. 8, a bus architecture may include any quantity of interconnected buses and bridges, specifically for interconnecting various circuits of one or more processors represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, that is, the transceiver 802 includes a transmitter and a receiver, and provides a unit for communicating with various other apparatuses on a transmission medium.

Specifically, the first control information is configured grant uplink control information.

Further, the at least one type of uplink control information further includes second control information.

The second control information includes at least one of hybrid automatic repeat request acknowledgement HARQ-ACK and channel state information CSI.

Optionally, before the target parameter of each type of uplink control information in the at least one type of uplink control information is determined based on the type of the configured grant physical uplink shared channel PUSCH, the processor 801 is configured to read a program in the memory 803 and further execute the following process:

in a case that the configured grant PUSCH is type 1, configuring, for a terminal by using radio resource control RRC, identification information corresponding to each type of uplink control information in the at least one type of uplink control information; where the identification information is used to assist the terminal in obtaining the target parameter of each type of uplink control information in the at least one type of uplink control information.

Optionally, before the target parameter of each type of uplink control information in the at least one type of uplink control information is determined based on the type of the configured grant physical uplink shared channel PUSCH, the processor 801 is configured to read a program in the memory 803 and further execute the following process:

in a case that the configured grant PUSCH is type 2, if it is determined that a configuration manner for a parameter indicated by radio resource control RRC is a semi-static manner, configuring, for a terminal by using RRC, identification information corresponding to each type of uplink control information in the at least one type of uplink control information; or if a configuration manner for a parameter indicated by RRC is a dynamic manner, sending downlink control information DCI to the terminal, where a parameter indicator field of the DCI includes indication information; and the indication information is used to indicate the identification information corresponding to each type of uplink control information in the at least one type of uplink control information, and the identification information is used to assist the terminal in obtaining the target parameter of each type of uplink control information in the at least one type of uplink control information.

Optionally, the processor 801 is configured to read a program, in the memory 803, for determining the positions of REs to be occupied by each type of uplink control information in the at least one type of uplink control information, and execute the following process:

mapping each type of uplink control information in the at least one type of uplink control information on the configured grant PUSCH by using a frequency-first mapping rule; and determining, based on a mapping relationship, the positions of REs to be occupied by each type of uplink control information in the at least one type of uplink control information.

Further, the processor 801 is configured to read a program, in the memory 803, for mapping each type of uplink control information in the at least one type of uplink control information to the configured grant PUSCH, and execute the following process:

mapping the first control information starting from the first usable non-DMRS OFDM symbol after the first demodulation reference signal DMRS orthogonal frequency division multiplexing OFDM symbol for transmission of the configured grant PUSCH; or mapping the first control information starting from the first usable non-DMRS OFDM symbol for transmission of the configured grant PUSCH.

Optionally, the at least one type of uplink control information further includes second control information, and the second control information includes hybrid automatic repeat request acknowledgement HARQ-ACK. The processor 801 is configured to read a program, in the memory 803, for mapping each type of uplink control information in the at least one type of uplink control information to the configured grant PUSCH, and execute the following process:

mapping the first control information and the HARQ-ACK starting from the first usable non-DMRS OFDM symbol after the first demodulation reference signal DMRS orthogonal frequency division multiplexing OFDM symbol for transmission of the configured grant PUSCH; or mapping the first control information starting from the first usable non-DMRS OFDM symbol for transmission of the configured grant PUSCH, and mapping the HARQ-ACK starting from the first usable non-DMRS OFDM symbol after the first DMRS OFDM symbol for transmission of the configured grant PUSCH; where the first control information and the HARQ-ACK are mapped to different REs.

Further, the processor 801 is configured to read a program, in the memory 803, for mapping the first control information and the HARQ-ACK starting from the first usable non-DMRS OFDM symbol after the first demodulation reference signal DMRS orthogonal frequency division multiplexing OFDM symbol for transmission of the configured grant PUSCH, and execute the following process:

mapping first target information starting from the first usable non-DMRS OFDM symbol after the first DMRS OFDM symbol for transmission of the configured grant PUSCH, and mapping second target information starting from the first usable non-DMRS OFDM symbol after the first DMRS OFDM symbol for transmission, where the second target information is mapped to REs other than REs occupied by the first target information; where the first target information is the first control information, and the second target information is the HARQ-ACK; or the first target information is the HARQ-ACK, and the second target information is the first control information.

Optionally, in a case that the second control information further includes channel state information CSI, the processor 801 is configured to read a program, in the memory 803, for mapping each type of uplink control information in the at least one type of uplink control information to the configured grant PUSCH, and execute the following process:

mapping the CSI starting from the first usable non-DMRS OFDM symbol for the configured grant PUSCH, where the CSI is mapped to REs other than REs occupied by the first control information and the HARQ-ACK.

Optionally, the processor 801 is configured to read a program, in the memory 803, for mapping the CSI starting from the first usable non-DMRS OFDM symbol for the configured grant PUSCH, where the CSI is mapped to REs other than REs occupied by the first control information and the HARQ-ACK; and execute the following process:

mapping a first part and a second part of the CSI separately starting from the first usable non-DMRS OFDM symbol for the configured grant PUSCH; where the first part is mapped to REs other than the REs occupied by the first control information and the HARQ-ACK; in a case that a bit length of the HARQ-ACK is less than a first preset value, the second part is able to be mapped to REs reserved for the HARQ-ACK; and in a case that the bit length of the HARQ-ACK is greater than a second preset value, the second part is mapped to REs other than REs occupied by the HARQ-ACK in a rate matching manner.

Optionally, the at least one type of uplink control information further includes second control information, and in a case that the second control information further includes channel state information CSI, the processor 801 is configured to read a program, in the memory 803, for mapping each type of uplink control information in the at least one type of uplink control information to the configured grant PUSCH; and execute the following process:

mapping the CSI starting from the first usable non-DMRS OFDM symbol for the configured grant PUSCH, where the CSI is mapped to REs other than REs occupied by the first control information.

The network-side device may be a base station (BTS) in global system for mobile communications (GSM) or code division multiple access (CDMA), or may be a base station (NodeB, NB) in wideband code division multiple access (WCDMA), or may be an evolved base station (Evolved Node B, eNB or eNodeB) in LTE, or a relay station or access point, or a base station in the future 5G network, which is limited herein.

The foregoing descriptions are optional implementations of this disclosure. It should be noted that a person of ordinary skill in the art may make several improvements and polishing without departing from the principle described in this disclosure and the improvements and polishing shall fall within the protection scope of this disclosure.

What is claimed is:

1. A method for transmitting uplink control information, applied to a terminal and comprising:
   obtaining a target parameter of each type of uplink control information in at least one type of uplink control information based on a type of a configured grant physical uplink shared channel (PUSCH), wherein the target parameter is used for determining the number of resource elements (REs) to be occupied by the uplink control information in the configured grant PUSCH;
   determining positions of REs to be occupied by each type of uplink control information in the at least one type of uplink control information; and
   based on the number of REs and the positions of REs, sending the at least one type of uplink control information through the configured grant PUSCH; wherein
   the at least one type of uplink control information comprises first control information;
   wherein the obtaining a target parameter of each type of uplink control information in at least one type of uplink control information based on a type of a configured grant physical uplink shared channel (PUSCH) comprises:
   in a case that the configured grant PUSCH is type 1, obtaining identification information corresponding to each type of uplink control information in the at least one type of uplink control information and configured by using radio resource control (RRC); and
   based on the identification information, determining a target parameter corresponding to the identification information of each type of uplink control information in the at least one type of uplink control information; or
   in a case that the configured grant PUSCH is type 2, if a configuration manner for a parameter indicated by radio resource control (RRC) is a semi-static manner, obtaining identification information corresponding to each type of uplink control information in the at least one type of uplink control information and configured by using RRC; or if a configuration manner for a parameter indicated by radio resource control (RRC) is a dynamic manner, obtaining indication information in a parameter indicator field comprised in downlink control information (DCI), and determining, based on the indication information, identification information corresponding to each type of uplink control information in the at least one type of uplink control information; and
   based on the identification information, determining a target parameter corresponding to the identification information of each type of uplink control information in the at least one type of uplink control information.

2. The method for transmitting uplink control information according to claim 1, wherein the first control information is configured grant uplink control information.

3. The method for transmitting uplink control information according to claim 1, wherein the at least one type of uplink control information further comprises second control information; and
   the second control information comprises at least one of hybrid automatic repeat request acknowledgement (HARQ-ACK) and channel state information (CSI).

4. The method for transmitting uplink control information according to claim 1, wherein the determining positions of REs to be occupied by each type of uplink control information in the at least one type of uplink control information comprises:
   mapping each type of uplink control information in the at least one type of uplink control information on the configured grant PUSCH by using a frequency-first mapping rule; and
   determining, based on a mapping relationship, the positions of REs to be occupied by each type of uplink control information in the at least one type of uplink control information.

5. The method for transmitting uplink control information according to claim 4, wherein the mapping each type of uplink control information in the at least one type of uplink control information on the configured grant PUSCH comprises:
   mapping the first control information starting from the first non-DMRS OFDM symbol after the first demodulation reference signal (DMRS) orthogonal frequency division multiplexing (OFDM) symbol for transmission of the configured grant PUSCH; or
   mapping the first control information starting from the first non-DMRS OFDM symbol for transmission of the configured grant PUSCH.

6. The method for transmitting uplink control information according to claim 4, wherein the at least one type of uplink control information further comprises second control information, and the second control information comprises hybrid automatic repeat request acknowledgement (HARQ-ACK); and the mapping each type of uplink control information in the at least one type of uplink control information on the configured grant PUSCH comprises:

mapping the first control information and the HARQ-ACK starting from the first non-DMRS OFDM symbol after the first demodulation reference signal (DMRS) orthogonal frequency division multiplexing (OFDM) symbol for transmission of the configured grant PUSCH; or mapping the first control information starting from the first non-DMRS OFDM symbol for transmission of the configured grant PUSCH, and mapping the HARQ-ACK starting from the first non-DMRS OFDM symbol after the first DMRS OFDM symbol for transmission of the configured grant PUSCH; wherein the first control information and the HARQ-ACK are mapped to different REs.

7. The method for transmitting uplink control information according to claim 6, wherein in a case that the second control information further comprises channel state information (CSI), the mapping each type of uplink control information in the at least one type of uplink control information on the configured grant PUSCH further comprises:

mapping the CSI starting from the first non-DMRS OFDM symbol for the configured grant PUSCH, wherein the CSI is mapped to REs other than REs occupied by the first control information and the HARQ-ACK.

8. The method for transmitting uplink control information according to claim 5, wherein the at least one type of uplink control information further comprises second control information, and the second control information comprises channel state information (CSI); and the mapping each type of uplink control information in the at least one type of uplink control information on the configured grant PUSCH further comprises:

mapping the CSI starting from the first non-DMRS OFDM symbol for the configured grant PUSCH, wherein the CSI is mapped to REs other than REs occupied by the first control information.

9. A terminal, comprising a memory, a processor, and a computer program stored in the memory and capable of running on the processor, wherein when the computer program is executed by the processor, following steps are implemented:

obtaining a target parameter of each type of uplink control information in at least one type of uplink control information based on a type of a configured grant physical uplink shared channel (PUSCH), wherein the target parameter is used for determining the number of resource elements (REs) to be occupied by the uplink control information in the configured grant PUSCH;

determining positions of REs to be occupied by each type of uplink control information in the at least one type of uplink control information; and based on the number of REs and the positions of REs, sending the at least one type of uplink control information through the configured grant PUSCH; wherein at least one type of uplink control information comprises first control information;

wherein the obtaining a target parameter of each type of uplink control information in at least one type of uplink control information based on a type of a configured grant physical uplink shared channel (PUSCH) comprises:

in a case that the configured grant PUSCH is type 1, obtaining identification information corresponding to each type of uplink control information in the at least one type of uplink control information and configured by using radio resource control (RRC); and based on the identification information, determining a target parameter corresponding to the identification information of each type of uplink control information in the at least one type of uplink control information; or in a case that the configured grant PUSCH is type 2, if a configuration manner for a parameter indicated by radio resource control (RRC) is a semi-static manner, obtaining identification information corresponding to each type of uplink control information in the at least one type of uplink control information and configured by using RRC; or if a configuration manner for a parameter indicated by radio resource control (RRC) is a dynamic manner, obtaining indication information in a parameter indicator field comprised in downlink control information (DCI), and determining, based on the indication information, identification information corresponding to each type of uplink control information in the at least one type of uplink control information; and based on the identification information, determining a target parameter corresponding to the identification information of each type of uplink control information in the at least one type of uplink control information.

10. The terminal according to claim 9, wherein the first control information is configured grant uplink control information.

11. The terminal according to claim 9, wherein the at least one type of uplink control information further comprises second control information; and the second control information comprises at least one of hybrid automatic repeat request acknowledgement (HARQ-ACK) and channel state information (CSI).

12. The terminal according to claim 9, wherein the determining positions of REs to be occupied by each type of uplink control information in the at least one type of uplink control information comprises:

mapping each type of uplink control information in the at least one type of uplink control information on the configured grant PUSCH by using a frequency-first mapping rule; and determining, based on a mapping relationship, the positions of REs to be occupied by each type of uplink control information in the at least one type of uplink control information.

13. The terminal according to claim 12, wherein the mapping each type of uplink control information in the at least one type of uplink control information on the configured grant PUSCH comprises:

mapping the first control information starting from the first non-DMRS OFDM symbol after the first demodulation reference signal (DMRS) orthogonal frequency division multiplexing (OFDM) symbol for transmission of the configured grant PUSCH; or mapping the first control information starting from the first non-DMRS OFDM symbol for transmission of the configured grant PUSCH.

14. The terminal according to claim 12, wherein the at least one type of uplink control information further comprises second control information, and the second control information comprises hybrid automatic repeat request acknowledgement (HARQ-ACK); and the mapping each type of uplink control information in the at least one type of uplink control information on the configured grant PUSCH comprises:

mapping the first control information and the HARQ-ACK starting from the first non-DMRS OFDM symbol after the first demodulation reference signal (DMRS) orthogonal frequency division multiplexing (OFDM) symbol for transmission of the configured grant PUSCH; or mapping the first control information starting from the first non-DMRS OFDM symbol for transmission of the configured grant PUSCH, and mapping the HARQ-ACK starting from the first non-DMRS OFDM symbol after the first DMRS OFDM symbol for transmission of the configured grant PUSCH; wherein the first control information and the HARQ-ACK are mapped to different REs.

15. The terminal according to claim 13, wherein the at least one type of uplink control information further comprises second control information, and the second control information comprises channel state information (CSI); and the mapping each type of uplink control information in the at least one type of uplink control information on the configured grant PUSCH further comprises:

mapping the CSI starting from the first non-DMRS OFDM symbol for the configured grant PUSCH, wherein the CSI is mapped to REs other than REs occupied by the first control information.

16. A network-side device, comprising a memory, a processor, and a computer program stored in the memory and capable of running on the processor, wherein when the computer program is executed by the processor, following steps are implemented:

determining a target parameter of each type of uplink control information in at least one type of uplink control information based on a type of a configured grant physical uplink shared channel (PUSCH), wherein the target parameter is used for determining the number of resource elements (REs) to be occupied by the uplink control information in the configured grant PUSCH;

determining positions of REs to be occupied by each type of uplink control information in the at least one type of uplink control information; and based on the number of REs and the positions of REs, receiving the at least one type of uplink control information on the configured grant PUSCH; wherein the at least one type of uplink control information comprises first control information;

wherein the determining a target parameter of each type of uplink control information in at least one type of uplink control information based on a type of a configured grant physical uplink shared channel (PUSCH) comprises:

in a case that the configured grant PUSCH is type 1, obtaining identification information corresponding to each type of uplink control information in the at least one type of uplink control information and configured by using radio resource control (RRC); and based on the identification information, determining a target parameter corresponding to the identification information of each type of uplink control information in the at least one type of uplink control information; or in a case that the configured grant PUSCH is type 2, if a configuration manner for a parameter indicated by radio resource control (RRC) is a semi-static manner, obtaining identification information corresponding to each type of uplink control information in the at least one type of uplink control information and configured by using RRC; or if a configuration manner for a parameter indicated by radio resource control (RRC) is a dynamic manner, obtaining indication information in a parameter indicator field comprised in downlink control information (DCI), and determining, based on the indication information, identification information corresponding to each type of uplink control information in the at least one type of uplink control information; and based on the identification information, determining a target parameter corresponding to the identification information of each type of uplink control information in the at least one type of uplink control information.

17. The method according to claim 3, wherein the in a case that the configured grant PUSCH is type 1, obtaining identification information corresponding to each type of uplink control information in the at least one type of uplink control information and configured by using radio resource control (RRC); and based on the identification information, determining a target parameter corresponding to the identification information of each type of uplink control information in the at least one type of uplink control information comprises:

in a case that the configured grant PUSCH is type 1, obtaining identification information corresponding to each type of uplink control information in the first control information and the second control information and configured by using radio resource control (RRC); and based on the identification information, determining the target parameter corresponding to the identification information of each type of uplink control information in the first control information and the second control information.

18. The method according to claim 3, wherein the in a case that the configured grant PUSCH is type 2, if a configuration manner for a parameter indicated by radio resource control (RRC) is a semi-static manner, obtaining identification information corresponding to each type of uplink control information in the at least one type of uplink control information and configured by using RRC; or if a configuration manner for a parameter indicated by radio resource control (RRC) is a dynamic manner, obtaining indication information in a parameter indicator field comprised in downlink control information (DCI), and determining, based on the indication information, identification information corresponding to each type of uplink control information in the at least one type of uplink control information; and based on the identification information, determining a target parameter corresponding to the identification information of each type of uplink control information in the at least one type of uplink control information comprises:

in a case that the configured grant PUSCH is type 2, obtaining identification information corresponding to the first control information configured by using RRC; and if a configuration manner for a parameter indicated by radio resource control (RRC) is a semi-static manner, obtaining identification information corresponding to the second control information configured by using RRC; or if a configuration manner for a parameter indicated by radio resource control (RRC) is a dynamic manner, obtaining indication information in a parameter indicator field comprised in downlink control information (DCI), and determining, based on the indication information, identification information corresponding to the second control information; and based on the identification information, determining the target parameter corresponding to the identification information of each type of uplink control information in the first control information and the second control information.

\* \* \* \* \*